Figure 2:
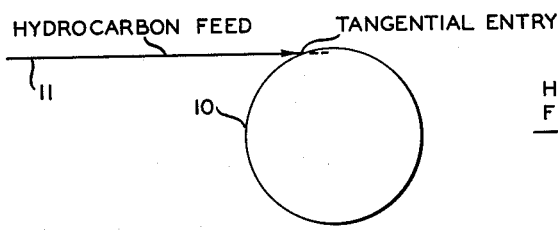

July 9, 1963

G. H. DALE 3,097,248

PROCESS AND APPARATUS FOR AUTO-REFRIGERATION IN CUPROUS
SALT SLURRY EXTRACTION PROCESS
Filed Feb. 13, 1959

INVENTOR.
G. H. DALE

BY
Hudson + Young
ATTORNEYS

United States Patent Office 3,097,248
Patented July 9, 1963

3,097,248
PROCESS AND APPARATUS FOR AUTO-REFRIGERATION IN CUPROUS SALT SLURRY EXTRACTION PROCESS
Glenn H. Dale, Bartlesville, Okla., assignor to Phillips Petroleum Company, a corporation of Delaware
Filed Feb. 13, 1959, Ser. No. 793,002
3 Claims. (Cl. 260—681.5)

This invention relates to the separation of hydrocarbons by a cuprous salt aqueous slurry process. In one of its aspects, the invention relates to the introduction of a mixture of cuprous salt aqueous slurry and hydrocarbon into a contacting vessel with flashing of a portion of the hydrocarbon to effect cooling of the stream and the avoidance of foaming and entrainment during vaporization by introducing the entering stream as a relatively thin sheet on a surface in the contacting vessel and effecting the flashing from this sheet or film.

In the reaction of cuprous chloride slurry in water with diolefin hydrocarbons a cuprous chloride-diolefin complex forms at low temperatures with the evolution of heat. In the pilot plant, this heat is removed by auto-refrigeration, i.e., the $C_4$-hydrocarbons are flashed in the reactor, taken overhead, recompressed and returned to the reactor. Experience has shown that the vapors in the reactor are very slow to disengage from the water slurry phase which results in gassing off the slurry reactor effluent pump.

This problem of foaming of the cuprous salt extraction solvent used for recovery of olefins and diolefins from mixtures is well known and in the prior art has been approached by chemical or physical purification of the solvent in order to prevent this foaming. Such an approach has the difficulty of introducing an additional step into the process with the attendant difficulty of increased complexity of processing and increased cost.

It is an object of the invention to recover hydrocarbons from an aqueous cuprous salt slurry containing the same. It is another object of the invention to provide for auto-refrigeration, without foaming, of a cuprous salt slurry containing hydrocarbons.

Other aspects, objects and the several advantages of the invention are apparent from a study of this disclosure, the drawing and the appended claims.

According to the present invention, the difficulty of foaming and entrainment in the auto-refrigeration of a mixture of solvent and hydrocarbon is substantially eliminated by effecting the flashing of the hydrocarbon from the mixture in the form of a thin sheet.

The method of the invention can be practiced by choosing particular points of introduction of the mixture into the vessel in which flashing is effected or by addition of, at most, very simple equipment in the already existing vessels.

Figure 4:
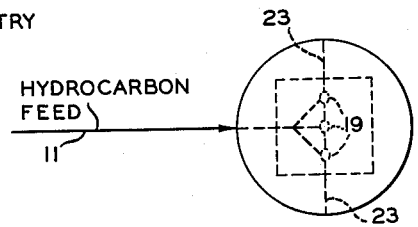
Figure 1:
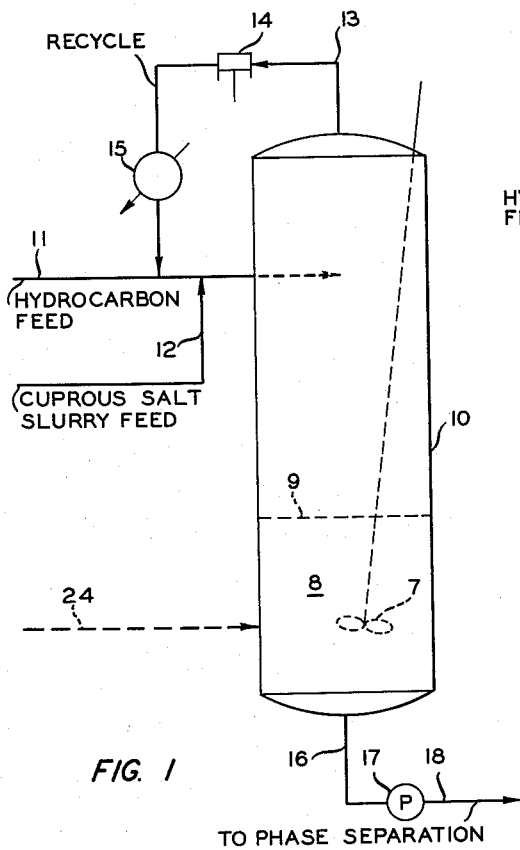
Figure 3:
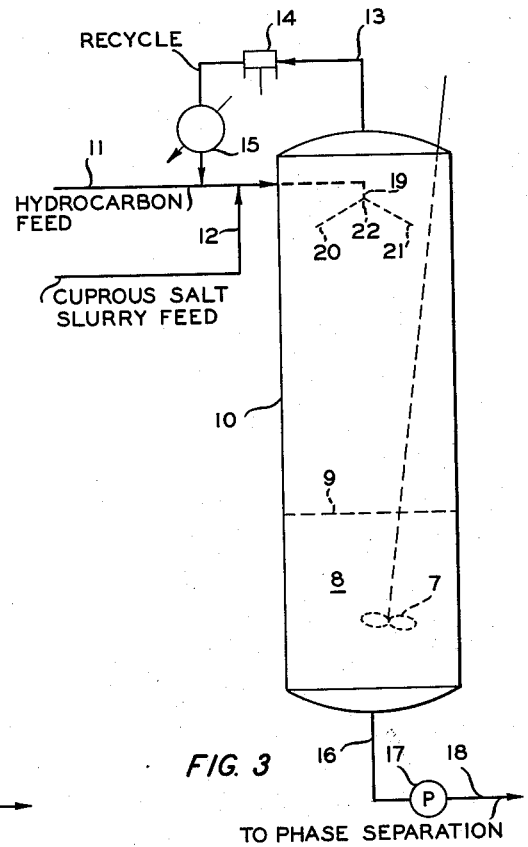

In the drawings, FIGURES 1 and 2 illustrate a tangential entry of the slurry along the vessel wall surface and FIGURES 3 and 4 illustrate entry of the slurry, onto plates disposed at an angle to the horizontal, from multiple outlets disposed at the apex or joining of the plates.

Referring now to FIGURES 1 and 2, vessel 10 is a stirred contactor containing a liquid body of aqueous cuprous salt absorbent and hydrocarbon which are being contacted by means of agitator 7. Hydrocarbon feed consisting of fresh hydrocarbons having four carbon atoms and containing olefins and diolefins is introduced through line 11 and recycled $C_4$-hydrocarbons from line 13 join slurry feed introduced through line 12 and is introduced tangentially along the wall of tank 10, spreading out in a relatively thin film on that wall. Pressure is maintained within the tank 10 to hold the desired temperature, and hydrocarbon flashes from the introduced feed to lower the temperature of the remaining liquid to the desired temperature. Flashed vapor is removed from the tank through line 13 by means of compressor 14 and is condensed in cooler 15 to be returned to the tank in a manner previously described. The emulsion of rich absorbent containing absorbed diolefins and extracted hydrocarbons is removed through line 16, pump 17 and line 18 to phase separator for recovery of the products and recycle of the slurry by conventional processing.

Referring now to FIGURES 3 and 4, additional surfaces 20 and 21 have been included in the apparatus utilized from which to effect the vaporization. These surfaces join at apex 22 and are suspended within the vessel by bar 23. Operation of the process is in a manner substantially the same as in the previous embodiment, differing therefrom only in the manner of introduction of the hydrocarbon and absorption slurry into the vessel. The mixture is introduced through line 11 and multiple outlets 19 onto apex 22, then flowing down the upper surfaces of sheets 20 and 21 in a relatively thin film from which flashing takes place, with the remaining liquid falling to the main body of the liquid below.

*Example*

In tests in which an aqueous slurry of cuprous chloride containing dissolved ammonium chloride and hydrochloric acid was used in the absorption of butadiene from a mixture containing it along with butenes and butane, the agitated absorption tank was maintained at about 32° F. A mixture of warm hydrocarbon and slurry was introduced under the cold liquid surface in the absorption tank as shown in FIGURE 1 by dotted line 24. When operating in this manner, with cooling effected by vaporization from the main body of the liquid, separation of the gases from the slurry phase was very slow and resulted in gassing off of the effluent pump 17.

The operation was changed to be in accordance with this invention and operated with introduction of the feed tangentially as described and illustrated with FIGURE 1, and no further difficulty was encountered due to foaming or slow separation of vapors from the liquid in the tank.

The aqueous slurries used in these tests had the following composition:

| Component: | Wt. percent |
|---|---|
| CuCl | 26 |
| $H_2O$ | 72.1 |
| $NH_4Cl$ | 1.3 |
| HCl | 0.6 |

Reasonable variation and modification are possible within the scope of the foregoing disclosure, the drawings and the appended claims to the invention, the essence of which is that, in the recovery of hydrocarbons from aqueous cuprous salt slurry, the hydrocarbons are flashed and foaming and entrainment during flashing or vaporization is avoided by introducing the entering stream as a relatively thin sheet onto a surface in the contacting vessel in which hydrocarbons are contacted with said slurry.

I claim:

1. A method for extracting diolefins from a mixture of hydrocarbons containing the same, together with olefins, which comprises admixing the said hydrocarbons with an aqueous cuprous chloride slurry, introducing a mixture thus obtained into a flashing contacting zone as a film above a liquid level of hydrocarbons and salt slurry being agitated therein, causing flashing of some of the hydrocarbons and producing in situ refrigeration, recovering, compressing and recycling hydrocarbons thus flashed as at least a portion of the hydrocarbons being introduced into said contacting zone, and removing diolefin-enriched slurry, emulsified with other non-dissolved hydrocarbons, from said zone for further treatment to recover a phase containing aqueous cuprous salt slurry and diolefins.

2. A method for the recovery of diolefins from a mixture of hydrocarbons containing the same, together with olefins, which comprises contacting the mixture of hydrocarbons with an aqueous cuprous chloride slurry, introducing the mixture thus obtained into an upper portion and above a liquid level therein of a flashing contacting zone so as to form a film of mixture which travels along a surface of said zone, obtaining flashing of hydrocarbons from said film, recovering, compressing and recycling hydrocarbons flashed from said mixture, removing from said zone an emulsion containing aqueous cuprous salt slurry enriched in diolefins and unabsorbed hydrocarbons, and recovering diolefins from said removed emulsion.

3. The method of claim 2 wherein said step of introducing into said contacting zone is accomplished by a tangential introduction onto a surface of said zone.

References Cited in the file of this patent

UNITED STATES PATENTS

| | | |
|---|---|---|
| 2,073,446 | Ellsberg | Mar. 9, 1937 |
| 2,334,955 | Putney | Nov. 23, 1943 |
| 2,369,559 | Gilliland | Feb. 13, 1945 |
| 2,401,114 | Schulze et al. | May 28, 1946 |
| 2,698,282 | Findlay | Dec. 28, 1954 |
| 2,779,724 | Dunning et al. | Jan. 29, 1957 |
| 2,788,378 | Cotton et al. | Apr. 9, 1957 |
| 2,847,487 | Kestner et al. | Aug. 12, 1958 |
| 2,925,452 | Bronghton | Feb. 16, 1960 |
| 2,938,866 | Engel et al. | May 31, 1960 |